(12) United States Patent
Flodman et al.

(10) Patent No.: US 7,377,743 B2
(45) Date of Patent: May 27, 2008

(54) COUNTERCOOLED TURBINE NOZZLE

(75) Inventors: David Allen Flodman, Rowley, MA (US); Jason David Shapiro, Methuen, MA (US); Michael Peter Kulyk, Kittery, ME (US)

(73) Assignee: General Electric Company, Schenectady, NY (US)

( * ) Notice: Subject to any disclaimer, the term of this patent is extended or adjusted under 35 U.S.C. 154(b) by 206 days.

(21) Appl. No.: 11/311,104

(22) Filed: Dec. 19, 2005

(65) Prior Publication Data

US 2007/0140849 A1     Jun. 21, 2007

(51) Int. Cl.
*F01D 5/18* (2006.01)

(52) U.S. Cl. .................... 415/115; 416/97 R

(58) Field of Classification Search ............. 415/115, 415/194, 195, 208.2, 209.2, 210.1; 416/97 R
See application file for complete search history.

(56) References Cited

U.S. PATENT DOCUMENTS

| | | | |
|---|---|---|---|
| 910,266 A * | 1/1909 | Belluzzo ............... | 415/173.1 |
| 2,917,276 A | 12/1959 | Klompas et al. | |
| 3,475,107 A | 10/1969 | Auxier | |
| 3,975,114 A | 8/1976 | Kalkbrenner | |
| 4,187,054 A | 2/1980 | Landis et al. | |
| 4,767,260 A | 8/1988 | Clevenger et al. | |
| 5,609,466 A | 3/1997 | North et al. | |
| 5,741,117 A | 4/1998 | Clevenger et al. | |
| 5,997,245 A | 12/1999 | Tomita et al. | |
| 6,099,245 A * | 8/2000 | Bunker ................... | 415/115 |
| 6,183,192 B1 | 2/2001 | Tressler et al. | |
| 6,270,317 B1 | 8/2001 | Manning et al. | |
| 6,345,955 B1 | 2/2002 | Heffron et al. | |
| 6,354,797 B1 | 3/2002 | Keyward et al. | |
| 6,398,488 B1 | 6/2002 | Solda et al. | |
| 6,425,738 B1 | 7/2002 | Shaw | |
| 6,428,273 B1 | 8/2002 | Keith et al. | |
| 6,579,061 B1 | 6/2003 | Heyward et al. | |
| 6,609,880 B2 | 8/2003 | Powis et al. | |
| 6,783,323 B2 | 8/2004 | Shiozaki et al. | |
| 6,887,041 B2 * | 5/2005 | Coke et al. ............ | 415/191 |
| 6,929,446 B2 | 8/2005 | Lu et al. | |
| 6,955,523 B2 * | 10/2005 | McClelland ........... | 415/115 |
| 7,094,027 B2 * | 8/2006 | Turner et al. .......... | 415/194 |
| 2005/0135921 A1 | 6/2005 | Busch et al. | |

* cited by examiner

*Primary Examiner*—Edward K. Look
*Assistant Examiner*—Devin Hanan
(74) *Attorney, Agent, or Firm*—William S. Andes; Francis L. Conte

(57) ABSTRACT

A turbine nozzle includes a mid vane mounted between a pair of end vanes in outer and inner bands. The mid vane includes a first pattern of film cooling holes configured to discharge more cooling air than each of the two end vanes having respective second patterns of film cooling holes.

25 Claims, 3 Drawing Sheets

COUNTERCOOLED TURBINE NOZZLE

The U.S. Government may have certain rights in this invention pursuant to contract number N00019-03-C-0361 awarded by the U.S. Department of the Navy.

BACKGROUND OF THE INVENTION

The present invention relates generally to gas turbine engines, and, more specifically, to turbine nozzles therein.

In a gas turbine engine, air is pressurized in a compressor and mixed with fuel in a combustor for generating hot combustion gases. Energy is extracted from the gases in a high pressure turbine (HPT) which powers the compressor, and additional energy is extracted in a low pressure turbine (LPT) which powers an upstream fan in an exemplary turbofan aircraft engine application, or drives an output drive shaft in marine and industrial applications.

The HPT and LPT include corresponding turbine nozzles which are heated by the hot combustion gases during operation. The first stage nozzles in the HPT and LPT each includes a row of hollow stator vanes integrally joined at opposite ends thereof to radially inner and outer bands. The stator vanes have identical airfoil configurations for channeling the combustion gases to a downstream row of turbine rotor blades extending radially outwardly from the perimeter of a supporting rotor disk.

The stator vanes also include identical cooling circuits therein in which corresponding partitions extend between the opposite pressure and suction sides of the airfoils to define several flow channels extending radially in span between the two bands for circulating in the airfoil a portion of pressurized cooling air bled from the compressor during operation.

The cooling circuits may have various conventional configurations and commonly include various rows of film cooling holes extending through the opposite pressure and suction sides of each airfoil for discharging the spent cooling air in corresponding thin films of cooling air that create thermally insulating blankets of air for externally protecting the vanes from the hot combustion gases.

The combustion gases first reach the stator vanes along the leading edges thereof which are typically protected by corresponding rows of film cooling or gill holes distributed along the span of each airfoil. The combustion gases then flow through corresponding nozzle channels between adjacent vanes and leave the nozzle along the trailing edges of the vanes. The thin trailing edges typically include a row of film cooling outlet slots that discharge another portion of the spent cooling air from the internal cooling circuits.

Since the nozzle vanes have specific aerodynamic airfoil configurations for use in extracting energy in the HPT and LPT, the velocity and pressure distributions of the combustion gases over the differently configured pressure and suction sides of each vane are different, and correspondingly create different heat loads on the vanes. Furthermore, each vane is fixedly mounted at its opposite ends to the outer and inner bands which are also subject to the heat loads of the combustion gases.

Since the nozzle is an annular structure, the heat loads from the combustion gases cause the nozzle to expand in diameter as it is heated, and to correspondingly contract in diameter as the heat, and corresponding operating temperature, are reduced.

This expansion and contraction of the annular turbine nozzle due to the change in heat loads from the combustion gases creates significant thermal stresses in both the individual vanes and supporting bands. Since the gas turbine engine operates in repeating cycles over its expected lifetime, the turbine nozzle is subject to heating and cooling cycles which introduce low cycle fatigue (LCF).

The life of the turbine nozzle is typically limited by the accumulating cycles of LCF experienced by the nozzle. The LCF life of the nozzle is typically limited by any one location in the nozzle that experiences the most accumulated fatigue from the LCF cycles which could eventually lead to a corresponding reduction in nozzle strength and the introduction of undesirable crack damage in the nozzle.

However, the LCF limited location in the turbine nozzle is a function of the specific operating cycle of the engine, and of the specific design of the nozzle itself including its specific cooling configuration.

The LCF life of the typical turbine nozzle is correspondingly increased by circumferentially dividing the annular nozzle into small segments typically including one or two nozzle vanes in corresponding segments of the outer and inner bands. Segmenting the annular nozzle interrupts the hoop continuity thereof and reduces the magnitude of thermal stresses therein.

However, segmenting the annular turbine nozzle correspondingly requires suitable seals between those segments which increase the complexity of the nozzle, and may reduce its overall efficiency.

A single vane nozzle segment fully uncouples the circumferential continuity of the annular nozzle, and allows the individual nozzle vane to freely expand and contract with its corresponding band segments.

In a two vane nozzle segment, or doublet, the individual vanes are no longer free to expand and contract alone, but are subject to the expansion and contraction of the second vane and its integral connection to the common band segments.

And, a three vane nozzle segment, or triplet, further increases thermal restraint since any one of the three vanes is integrally interconnected with the other two vanes by the corresponding band segments.

In particular, thermal expansion of the three vane segment tends to straighten the circumferential curvature or arc of the outer band which introduces tensile loads in the two outboard or end vanes, while correspondingly introducing compression loads in the middle or mid vane.

Since the vanes themselves, their cooling configurations, and the mounting band segments are typically identical from segment to segment, the different thermal loads experienced in the segments introduce different thermal stresses in the vanes and bands which adversely affect the LCF life of the nozzle. Since the middle vane in the three vane nozzle segment is structurally trapped by the two end vanes and the common supporting bands, the LCF life limiting location may be found in the middle vane.

The complexity of the modern gas turbine engine turbine nozzles and their hostile operating environment therefore require a balance of engine performance or efficiency and LCF life.

Accordingly, it is desired to provide a turbine nozzle having an improved configuration for increasing both aerodynamic efficiency and LCF life thereof.

BRIEF DESCRIPTION OF THE INVENTION

A turbine nozzle includes a mid vane mounted between a pair of end vanes in outer and inner bands. The mid vane includes a first pattern of film cooling holes configured to discharge more cooling air than each of the two end vanes having respective second patterns of film cooling holes.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
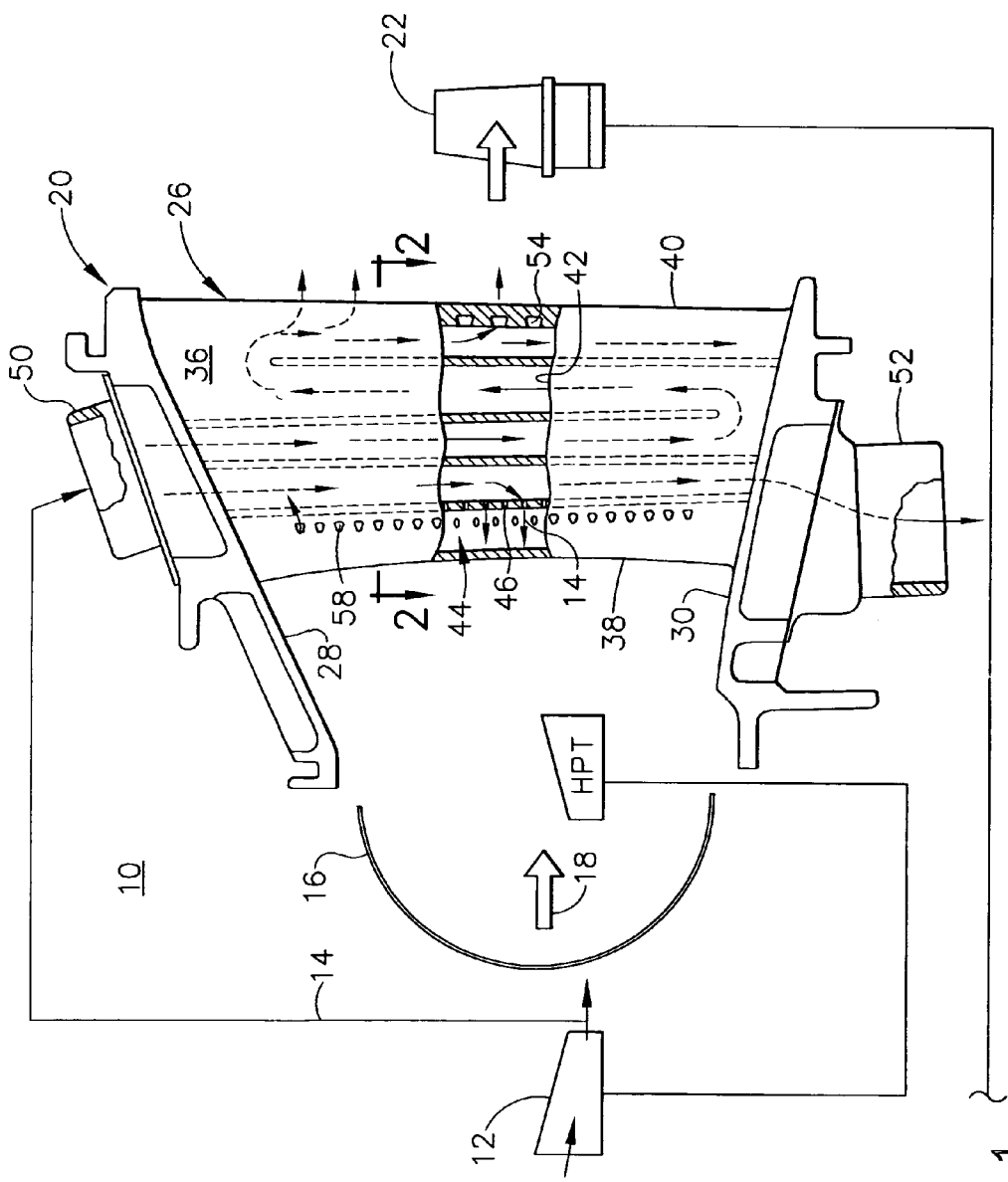
FIG. 1 is a schematic representation of an exemplary gas turbine engine including a first stage LPT turbine nozzle therein.

Illustrated schematically in FIG. 1 is a gas turbine engine 10 which is axisymmetrical about a longitudinal or axial centerline axis. The engine includes a conventional multistage axial compressor 12 configured for pressurizing air 14. The pressurized air 14 is channeled into a conventional annular combustor 16 wherein it is mixed with fuel and ignited for generating hot combustion gases 18.

The combustion gases are discharged from the combustor into a high pressure turbine (HPT) which is joined by a drive shaft to the rotor of the compressor 12 for rotating the several rows of compressor rotor blades therein during operation.

The core engine illustrated in FIG. 1 may be used in any typical gas turbine engine, such as a turbofan aircraft engine in which an upstream fan (not shown) is driven by a downstream low pressure turbine (LPT), in the typical turbofan aircraft engine application. Or the LPT may be joined to an external drive shaft for marine and industrial engine applications.

The LPT includes an annular, first stage turbine nozzle 20 specifically configured for directing the combustion gases into a row of conventional first stage turbine rotor blades 22 extending radially outwardly from a supporting rotor disk. Energy is extracted from the blades 22 to rotate the disk and the corresponding drive shaft.

Figure 2:
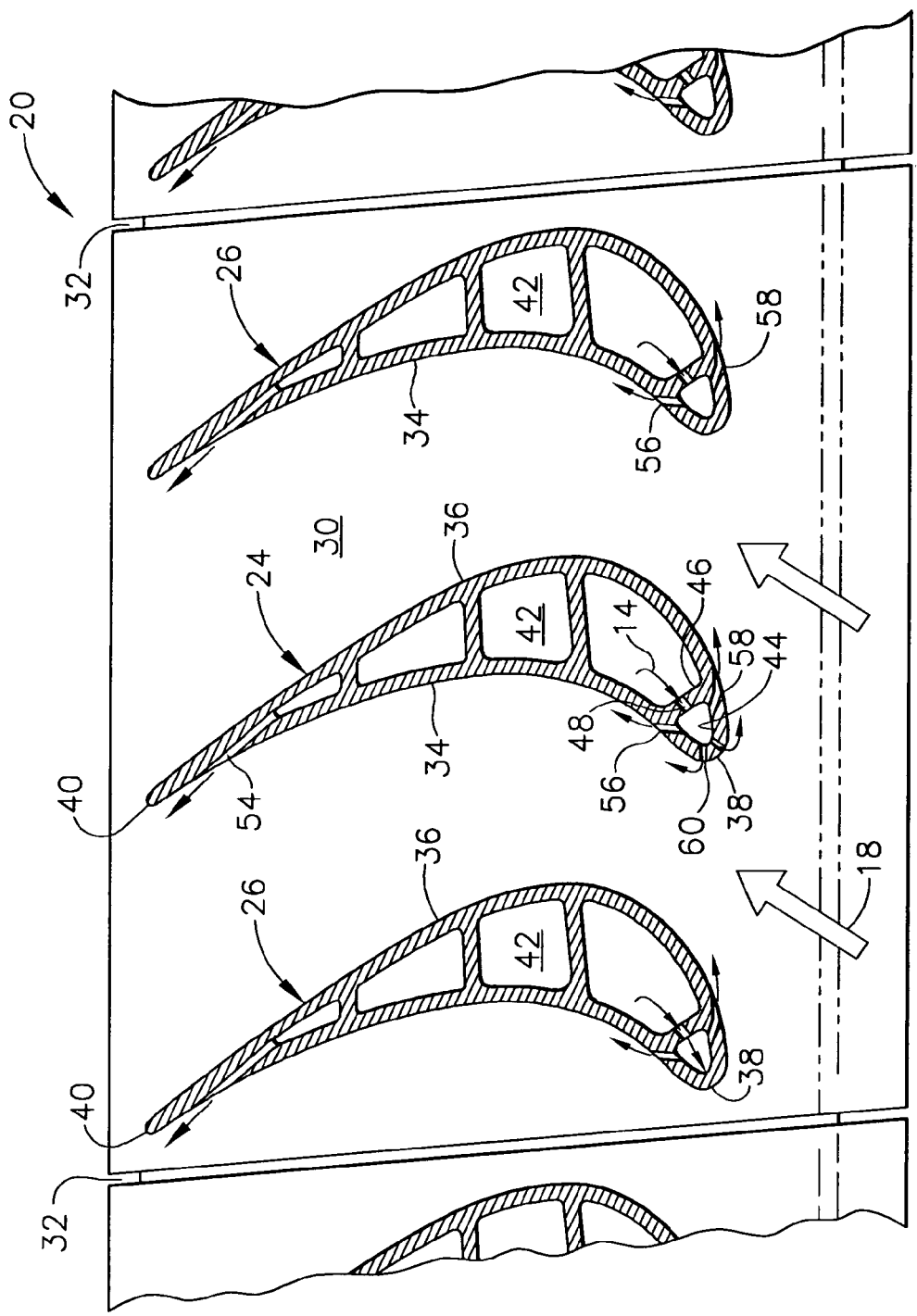
FIG. 2 is a planiform view of a portion of the turbine nozzle illustrated in FIG. 1 and taken along line 2-2.

The first stage turbine nozzle 20 illustrated in FIGS. 1 and 2 is an annular assembly having triple-vane segments. Each triplet segment includes an inboard or middle vane 24 spaced circumferentially apart from two outboard or end vanes 26. The three vanes 24,26 extend radially in span and are integrally joined at opposite ends thereof to circumferentially arcuate outer and inner bands 28,30 in segments corresponding to the three vanes.

The three vanes may be integrally cast or brazed to the supporting bands 28,30 to form a unitary or one piece assembly thereof. In this way, the three vanes are rigidly interconnected by the two bands 28,30 and those two bands provide continuous portions of the radially outer and inner flow boundaries for the combustion gases 18 which are channeled therebetween during operation.

As shown in FIG. 2, the opposite circumferential ends of the nozzle segments interrupt the circumferential continuity of the annular nozzle at corresponding axial splitlines 32, which are suitably sealed using conventional spline seals trapped therebetween. In this way, the triple vane segments have fewer splitlines 32 around the circumference of the nozzle than two or one vane nozzle segments found in the art. The fewer splitlines and fewer spline seals correspondingly increase the efficiency of the turbine nozzle during operation.

Each of the vanes 24,26 illustrated in FIG. 2 has an identical airfoil configuration for channeling the combustion gases 18 to the downstream turbine blades. For example, each vane includes a generally concave pressure sidewall 34, and a circumferentially opposite, generally convex suction sidewall 36. The two sidewalls extend radially in span between the outer and inner bands 28,30 as illustrated in FIG. 1 and are integrally joined thereto by brazing or casting as described above. The two sidewalls of each vane also extend axially in chord between opposite leading and trailing edges 38,40.

Each of the vanes in the turbine nozzle illustrated in FIGS. 1 and 2 is hollow and includes a similar or identical internal cooling circuit 42 therein for circulating the pressurized cooling air 14 therethrough for internally cooling the vanes. The cooling circuit 42 may have any conventional configuration and is typically defined by corresponding partitions or ribs which integrally bridge the pressure and suction sidewalls to form radially extending flow channels therein.

For example, the cooling circuit includes a first flow channel 44 disposed directly behind the leading edge 38 in each of the vanes bounded by an integral perforate partition or rib 46. This first rib 46 includes a row of impingement holes 48, as best shown in FIG. 2, through which the cooling air is discharged in corresponding jets against the back surface of the leading edge for impingement cooling thereof. In this embodiment, the vanes do not include a discrete or removable impingement baffle or insert commonly found in turbine nozzles.

The first channel 44 is fed cooling air from the second radial channel therebehind in a dedicated leading edge cooling circuit. The cooling circuit 42 also includes a three pass serpentine leg defined by three more flow channels leading to the trailing edge and separated by corresponding partitions.

As shown in FIG. 1, each of the vanes includes a corresponding inlet 50 through the outer band 28 which receives pressurized air from the compressor. A pair of outlets 52 are provided in a common plenum below the inner band 30 for discharging from the three vanes some of the cooling air therefrom. And, each of the vanes also includes a row of trailing edge slots or outlets 54 which discharge the spent serpentine cooling air on the pressure side of the vanes just before the trailing edge.

All of the vanes 24,26 in the turbine nozzle illustrated in the Figures are identical to each other except in the leading edge regions thereof. In particular, the mid vane 24 illustrated in FIGS. 2 and 3 includes a first pattern of film cooling holes 56,58,60 disposed in columns or rows along the leading edge 38 in flow communication with the first channel 44 for discharging therefrom the spent impingement air.

In contrast, each of the two end vanes 26 in each triplet nozzle segment includes a second pattern of film cooling holes 56,58 disposed in columns or rows along the leading edges 38 of the end vanes in flow communication with the first channels 44 therein for discharging the spent impingement air therefrom.

Since each nozzle segment includes at least three vanes, the two end vanes 26 are preferably identical to each other, including the corresponding second patterns of film cooling holes 56,58 disposed near the leading edge thereof. In contrast, the first pattern of film cooling holes 56,58,60 in the mid vane 24 is specifically different than the second pattern for collectively discharging more film cooling air in the leading edge region of the mid vane 24 than in the corresponding leading edge regions of the two end vanes 26.

The three vanes 24,26 illustrated in FIG. 2 in each nozzle segment have identical internal cooling circuits including identical impingement cooling of the leading edges behind which the spent impingement cooling air is collected in the respective first channels 44. By introducing the different first and second patterns of film cooling holes at the leading edges of the mid vane 24 and the two end vanes 26, the spent impingement air discharged from the first channels 44 may be preferentially used for differently cooling the leading edge of the middle vane from the two end vanes.

In a preferred embodiment, the first pattern includes more film cooling holes than the second pattern for collectively discharging more cooling air from the mid vane 24 than from each of the two end vanes 26 along the leading edges thereof. In this way, the increased or larger quantity of film cooling holes at the leading edge of the mid vane may be used for increasing leading edge cooling of the mid vane as compared with leading edge cooling of the two end vanes having fewer film cooling holes along their leading edges.

For example, all of the film cooling holes 56,58,60 in the two different patterns found in the triplet vanes 24,26 preferably have similar or identical inlet diameters of about 14 mils (0.36 mm) which meter or restrict the discharge flowrate therefrom. Since the diameter of these film cooling holes is at the minimum size for practical use in vane cooling, the quantity of film cooling holes in the two patterns may be preferentially different, for differently cooling the middle vane as compared with the two end vanes.

By providing increased cooling of the middle vane, the thermal stresses therein may be correspondingly reduced to offset the otherwise higher thermal stresses therein due to the thermal expansion and contraction problems described above. Reducing the thermal stress in the middle vane can correspondingly improve the LCF life of the nozzle triplet segments.

During the continuing development of the first stage LPT turbine nozzle disclosed above, the LCF life limiting location of the nozzle triplet was found to be the leading edge region of the middle vane having identical vane configurations for all three vanes of the triplet, with only two rows of film cooling holes along the leading edge of each vane. By introducing additional film cooling along the leading edge of the middle vane 24 only, in comparison with the two end vanes 26 in each triplet, the temperature and thermal stresses in the leading edge region of the middle vane can be reduced for correspondingly increasing the LCF life of the nozzle.

The three vanes in each nozzle triplet similarly include the common second pattern of film cooling holes 56,58 along or near the leading edges 38 thereof, with the mid vane 24 including additional film cooling holes 60 in the new first pattern for locally increasing the cooling effectiveness of the impingement air inside the first channel 44, as well as increasing cooling outside the leading edge of the mid vane when the spent impingement air is discharged therefrom.

Figure 3:
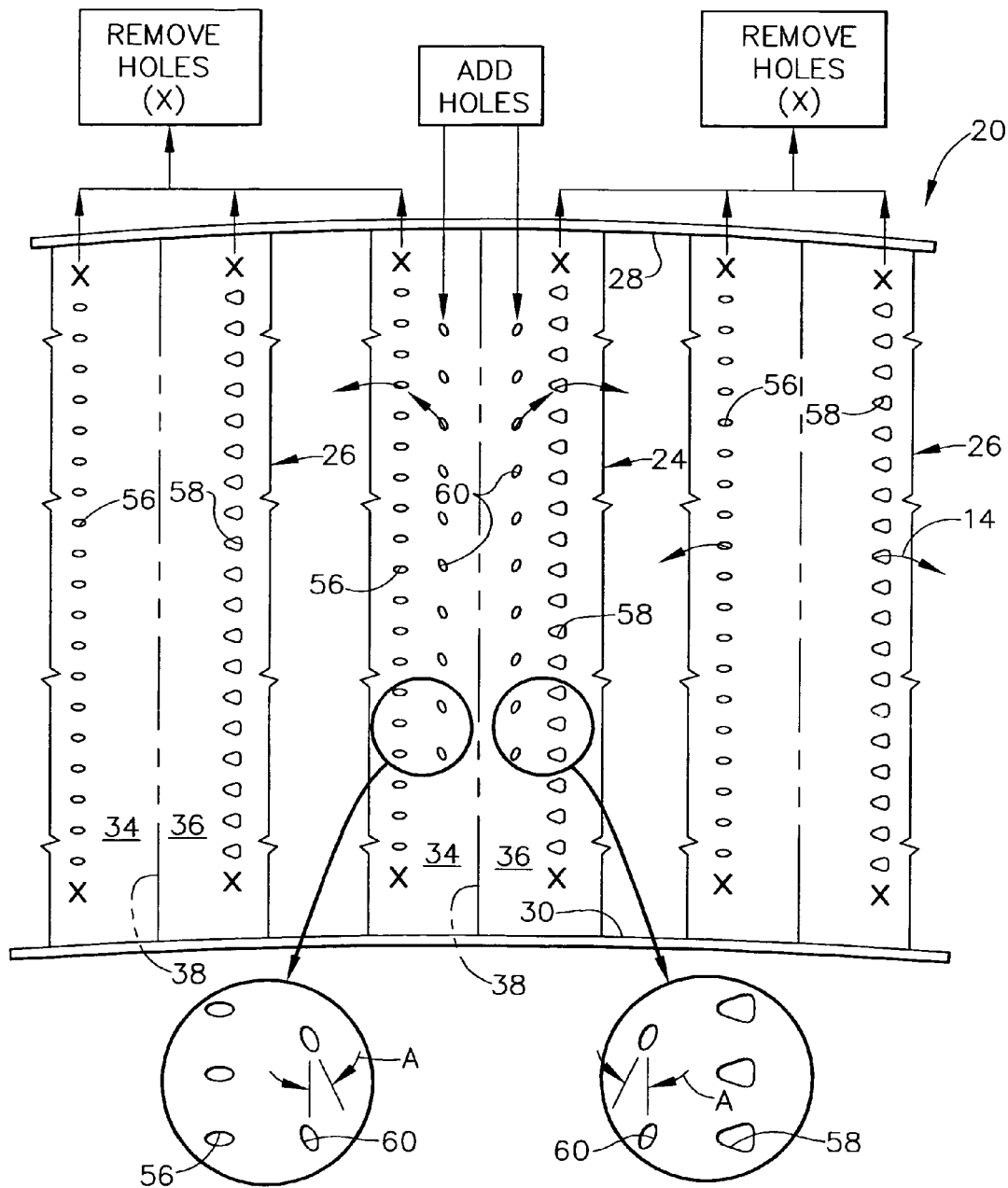
FIG. 3 is a schematic front elevational view of the nozzle segment illustrated in FIG. 2 showing different first and second patterns of film cooling holes therein.

As shown in FIGS. 2 and 3, the first pattern of film cooling holes 56,58,60 in the mid vane 24 preferably includes therein the same second pattern of holes 56,58 found in the two end vanes 26 for maintaining similar performance thereof.

More specifically, both the first and second patterns of holes include a similar or identical first row of first film cooling holes 56 which extend through the pressure sidewalls 34 of the two types of vanes 24,26. The two patterns also include a similar or identical second row of second film cooling holes 58 extending through the suction sidewalls 36 of the two types of vanes. Both hole patterns therefore share the first and second rows of holes 56,58 in preferably identical configurations corresponding with conventional gill holes.

The first pattern of holes is different than the second pattern by further including one or more rows of the additional third film cooling holes 60 near the leading edge 38 of the mid vane 24, which additional holes 60 are not found in the second patterns in the two end vanes 26, which instead are preferably imperforate across the leading edge between the two rows of gill holes 56,58 on opposite sides of the vanes.

As best shown in FIG. 3, the first pattern preferably includes two additional rows of the third film cooling holes 60 disposed along the span of the leading edge 38 of the mid vane 24, which additional holes extend through the pressure and suction sidewalls 34,36, respectively, in a showerhead configuration.

In the preferred embodiment illustrated in FIG. 3, the two additional rows of film cooling holes 60 are disposed within the range of about 30 percent to about 85 percent span from the inner band 30 to the outer band 28 to correspond with the peak temperature distribution of the combustion gases incident upon the leading edge of the mid vane.

The first film cooling holes 58 as illustrated in FIGS. 2 and 3 are preferably cylindrical in cross section and are axially inclined aft from the first flow channel 44 for effecting oval outlets on the pressure sidewall 34. The second film cooling holes 60 are similarly inclined axially aft through the suction sidewall 36 from the first channel 44, but are preferably divergent in cross section from cylindrical inlets for effecting diffusion of the discharged film cooling air.

The cylindrical first holes 58 and the divergent second holes 60 may have any conventional configuration, and each row preferably numbers nineteen in quantity over the radial span of the mid vane 24 as well as over the span of the two end vanes 26.

The third film cooling holes 60 in the two additional rows along the leading edge are also cylindrical in cross section in one embodiment, and number ten each in quantity in each row. The third film cooling holes 60 are inclined axially aft in the manner of the first and second holes 56,58, as well as having a radial component of inclination A which is about 25 degrees in the exemplary embodiment.

The row of compound inclined third holes 60 on the pressure sidewall 34 of the mid vane 24 are inclined aft toward the outer band, whereas the row of third film cooling holes 60 on the suction sidewall 36 are similarly inclined aft toward the outer band 28 with substantially the same compound angle of inclination.

The center biased nozzle triplet illustrated schematically in FIG. 3 effects a method of selectively cooling the differently configured nozzle vanes 24,26 to offset thermally induced stress in the mid vane 24 due to differential thermal expansion and contraction of the different components within the nozzle triplet segment. As initially shown in FIGS. 1 and 2, the pressurized cooling air 14 is distributed in parallel flow into the corresponding internal cooling circuits 42 of each of the three vanes in each nozzle triplet.

And, more of the cooling air 14 is distributed or redistributed through the first pattern of film cooling holes 56,58,60 in the mid vane 24 than through each of the second patterns of film cooling holes 56,58 in the two end vanes 26. In this way, cooling air may be redistributed from both end vanes 26 in each triplet to the mid vane 24 mounted therebetween for discharge from the first pattern of film cooling holes 56,58,60 which are collectively greater in quantity than the number of holes in the first patterns found in each of the two end vanes.

In this way, the greater density of film cooling holes around the leading edge 38 of the mid vane 24 is effective for discharging more film cooling air therefrom than from the lower density second patterns of film cooling holes found around the leading edges 38 of the two end vanes 26. Less of the cooling air is channeled through the two end vanes 26 and is instead diverted to the common mid vane 24 mounted therebetween for increasing leading edge cooling of the mid vane.

The increase in cooling airflow through the mid vane 24 may be offset or counterbalanced by the loss in cooling air flow through both end vanes 26. In this way, countercooling is effected in the nozzle triplet by increasing leading edge cooling of the mid vane 24 at the expense or loss of additional leading edge cooling of the two end vanes 26 which do not include the additional holes 60.

Countercooling of the two different cooling configurations of the mid vane 24 and two end vanes 26 may be effected by increase or gain in the flowrate of the cooling air discharged from the first pattern of film cooling holes 56,58,60 in the mid vane 24 by correspondingly reducing the flowrate of cooling air through the two end vanes 26. Since the three vanes in each of the nozzle triplets are identical in configuration to each other except for the different patterns of leading edge film cooling holes, then the gain in flowrate from the first pattern of holes may be preferentially obtained by the corresponding loss in flowrate through the second pattern of holes.

FIG. 3 illustrates schematically an intermediate-design nozzle triplet having two additional film cooling holes (X) in the six corresponding rows of first holes 56 and second holes 58 prior to the addition of the third film cooling holes 60 in the mid vane. In the intermediate nozzle triplet, all three vanes in the nozzle triplet are identical to each other, with each including a row of twenty one first holes 56 on the pressure sidewall and another row of twenty one second holes 58 on the suction sidewall. A given flowrate of the cooling air flow is provided to each nozzle triplet and divided substantially equally between the three vanes therein.

In contrast, the nozzle triplet illustrated in FIG. 3 may be readily modified by introducing the two rows of additional third film cooling holes 60 in the mid vane 24 alone, which correspondingly increase the airflow requirement of the mid vane 24. To counterbalance that increased air flow requirement, one each (X) of the original first and second film cooling holes 56,58 found in the original three vanes is removed just below the outer band 28 and just above the inner band 30 for collectively reducing the air flow requirements of those six rows.

In this way, twelve of the first and second holes 56,58 are eliminated (X) to offset the introduction of the twenty new third holes 60 formed in two rows along the leading edge of the mid vane. But for this modification of the LPT nozzle 20 to introduce the different patterns of cooling holes as described herein, the original or intermediate LPT nozzle 20 is conventional in configuration and operation, and has been on sale and in public use in the USA for many years.

Since the first and second holes 56,58 have different configurations and are differently mounted on the opposite pressure and suction sidewalls 34,36 of the three vanes, they correspondingly meter airflow therethrough differently.

Analysis indicates that the additional flowrate required for the added showerhead holes 60 is substantially offset by the reduction in flowrate due to the elimination of the twelve first and second gill holes 56,58 described above. Since the temperature of the combustion gases which flow over the nozzle vanes 24,26 is center peaked in general, the selective elimination of the twelve holes (X) near the outer and inner bands does not significantly reduce cooling performance of the vanes near the bands.

However, the introduction of the third film cooling holes 60 within the midspan range of about 30 percent to about 85 percent above the inner band 30 corresponds with the center peaking of the combustion gas flow to preferentially increase film cooling along the leading edge of the mid vane 24.

It is noted that the introduction of the third film cooling holes 60 closely adjacent to the leading edge 38 of the mid vane 24 has a compound cooling effect. Firstly, the additional rows of third film cooling holes 60 further protect and cool the external surface of the mid vane 24 around the leading edge. And, as shown in FIG. 2, the increased flowrate to feed the additional rows of film cooling holes 60 are fed from the common leading edge chamber 44, which correspondingly increases the cooling effectiveness of the increased impingement airflow channeled through the row of impingement holes 48.

As indicated above, the preferential additional cooling of the leading edge region of the mid vane 24 compared with the corresponding leading edge regions of the two end vanes 26 may be used to advantage for offsetting the thermally induced stresses in the mid vane 24 due to the differential thermal expansion and contraction of the nozzle triplet during operation in a gas turbine engine. For a given total flowrate of cooling air provided to each nozzle triplet, that air is preferentially distributed more to the mid vane 24 than to each of the two end vanes 26 for improving the durability and LCF life of the first stage turbine nozzle, while enjoying the increased aerodynamic performance due to the triplet construction requiring fewer of the axial splitlines 32 around the circumference thereof.

In alternate embodiments, the different first and second hole patterns for the mid and end vanes may be differently configured for differently cooling those vanes. For example, the two patterns may be different in hole size or diameter where larger holes may be used to control the different flowrates desired. The hole quantity in the different patterns may be the same or different, as desired.

And, the distribution, placement, and configuration of the film cooling holes may also be varied to effect the different cooling performance for offsetting the different thermal stress in the mid vane or vanes relative to the outboard vanes in the nozzle triplet, or in even greater vane segments.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine nozzle comprising a mid vane having a first pattern of film cooling holes configured to discharge more cooling air than each of two adjacent end vanes having respective second patterns of film cooling holes.

2. A nozzle according to claim 1 wherein:
each of said vanes includes opposite pressure and suction sidewalls extending in span between outer and inner bands integrally joined thereto, and extending in chord between opposite leading and trailing edges;
each of said vanes is hollow and further includes an internal cooling circuit for circulating said cooling air therethrough for discharge from said first and second patterns of holes; and
said first pattern includes more holes than said second pattern for discharging more cooling air from said mid vane than from each of said end vanes.

3. A nozzle according to claim 2 wherein said end vanes are substantially identical to each other, including said second patterns of film cooling holes therein, and said first pattern of film cooling holes in said mid vane is different than said second pattern.

4. A nozzle according to claim 3 wherein said first pattern of film cooling holes in said mid vane includes said second pattern therein.

5. A nozzle according to claim 4 wherein:
said internal cooling circuit includes a first channel behind said leading edge bounded by a perforate rib for impingement cooling said leading edge;
said first pattern of film cooling holes is disposed along said leading edge of said mid vane in flow communication with said first channel therein; and
said second patterns of film cooling holes are disposed along said leading edges of said end vanes in flow communication with said first channels therein.

6. A nozzle according to claim 5 wherein:
said first and second patterns include a similar first row of holes through said pressure sidewall of said vanes, and a similar second row of holes through said suction sidewalls; and
said first pattern includes additional holes near said leading edge of said mid vane not found in said second patterns in said end vanes.

7. A nozzle according to claim 6 wherein said first pattern includes two additional rows of film cooling holes along said leading edge of said mid vane extending through said pressure and suction sidewalls, respectively.

8. A nozzle according to claim 7 wherein:
said first row of film cooling holes are cylindrical and number nineteen in quantity;
said second row of film cooling holes are divergent and number nineteen in quantity; and
said two additional rows of film cooling holes are cylindrical and number ten each in quantity.

9. A nozzle according to claim 8 wherein said two additional rows of film cooling holes are disposed within the range of about 30 percent to about 85 percent span from said inner band to said outer band.

10. A nozzle according to claim 9 wherein all of said film cooling holes have similar inlet diameters.

11. A turbine nozzle comprising:
a mid vane and two end vanes integrally joined at opposite ends to outer and inner bands; and
said mid vane having a different pattern of film cooling holes than said end vanes.

12. A nozzle according to claim 11 wherein said mid vane includes a first pattern of said holes configured to collectively discharge more cooling air than each of said end vanes having a different second pattern of said holes therein.

13. A nozzle according to claim 12 wherein each of said vanes is hollow and includes a similar internal cooling circuit therein for circulating said cooling air therethrough for discharge from said different first and second patterns of film cooling holes.

14. A nozzle according to claim 13 wherein said first pattern includes more holes than said second pattern for discharging more of said cooling air from said mid vane than from each of said end vanes.

15. A nozzle according to claim 14 wherein all of said film cooling holes have similar inlet diameters.

16. A nozzle according to claim 14 wherein said first pattern of holes is disposed at a life limiting location of said mid vane.

17. A nozzle according to claim 14 wherein:
each of said vanes includes opposite pressure and suction sidewalls extending in span between said outer and inner bands, and extending in chord between opposite leading and trailing edges;
said first pattern of holes is disposed along said leading edge of said mid vane; and
said second patterns of holes are disposed along said leading edges of said end vanes.

18. A nozzle according to claim 17 wherein:
said first and second patterns include a similar first row of holes through said pressure sidewall of said vanes, and a similar second row of holes through said suction sidewalls; and
said first pattern includes additional holes near said leading edge of said mid vane not found in said second patterns in said end vanes.

19. A nozzle according to claim 18 wherein said first pattern includes two additional rows of film cooling holes along said leading edge of said mid vane extending through said pressure and suction sidewalls, respectively.

20. A nozzle according to claim 19 wherein said two additional rows of film cooling holes are disposed within the range of about 30 percent to about 85 percent span from said inner band to said outer band.

21. A method of countercooling said nozzle according to claim 13 comprising redistributing said cooling air from both said end vanes to said mid vane through said first pattern of film cooling holes.

22. A method of according to claim 21 wherein less of said cooling air is channeled through said end vanes and instead diverted to said mid vane for increasing cooling thereof.

23. A method according to claim 22 wherein the flowrate gain in cooling air discharged from said first pattern of film cooling holes in said mid vane is obtained by reducing flowrate of cooling air to said end vanes.

24. A method of countercooling a turbine nozzle comprising:
channeling cooling air into corresponding internal cooling circuits in a mid vane mounted between a pair of end vanes integrally joined at opposite ends to outer and inner bands; and
distributing more of said cooling air through a first pattern of film cooling holes in said mid vane than through each of a second pattern of film cooling holes in said end vanes.

25. A method according to claim 24 wherein said first and second patterns of film cooling holes are disposed along corresponding leading edges of said mid and end vanes on opposite pressure and suction sidewalls thereof for discharging more film cooling air along said leading edge of said mid vane than along said leading edges of said end vanes.

* * * * *